(12) United States Patent
Petter et al.

(10) Patent No.: US 8,046,467 B2
(45) Date of Patent: Oct. 25, 2011

(54) MAINTAINING CLIENT AFFINITY IN NETWORK LOAD BALANCING SYSTEMS

(75) Inventors: Vladimir Petter, Bellevue, WA (US);
Siddhartha Sen, New York, NY (US);
Andrea D'Amato, Kirkland, WA (US);
Jimmy C. Yu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 172 days.

(21) Appl. No.: 12/201,254

(22) Filed: Aug. 29, 2008

(65) Prior Publication Data
US 2010/0057923 A1    Mar. 4, 2010

(51) Int. Cl.
*G06F 15/173* (2006.01)
*G06F 15/16* (2006.01)
*G06F 9/46* (2006.01)
(52) U.S. Cl. .................... 709/226; 709/229; 718/105
(58) Field of Classification Search ............... 709/226, 709/229; 718/105; 707/782, 783
See application file for complete search history.

(56) References Cited

U.S. PATENT DOCUMENTS

| | | | |
|---|---|---|---|
| 6,006,259 A | 12/1999 | Adelman et al. | |
| 6,424,992 B2 | 7/2002 | Devarakonda et al. | |
| 6,587,866 B1 * | 7/2003 | Modi et al. ................... | 718/105 |
| 6,671,259 B1 | 12/2003 | He et al. | |
| 6,691,165 B1 | 2/2004 | Bruck et al. | |
| 6,735,205 B1 | 5/2004 | Mankude et al. | |
| 6,748,437 B1 * | 6/2004 | Mankude et al. ............. | 709/227 |
| 7,003,574 B1 | 2/2006 | Bahl | |
| 7,209,977 B2 | 4/2007 | Acharya et al. | |
| 7,277,897 B2 * | 10/2007 | Bamford et al. .............. | 707/782 |
| 7,353,276 B2 * | 4/2008 | Bain et al. ..................... | 709/225 |
| 7,600,036 B2 * | 10/2009 | Hesselink et al. ............. | 709/234 |
| 7,890,463 B2 * | 2/2011 | Romem et al. ................ | 707/636 |
| 2001/0052024 A1 | 12/2001 | Devarakonda et al. | |
| 2002/0010783 A1 | 1/2002 | Primak et al. | |
| 2002/0107962 A1 | 8/2002 | Richter et al. | |
| 2002/0143953 A1 * | 10/2002 | Aiken, Jr. ..................... | 709/227 |
| 2002/0143965 A1 | 10/2002 | Aiken, Jr. | |
| 2003/0065711 A1 | 4/2003 | Acharya et al. | |
| 2004/0205250 A1 * | 10/2004 | Bain et al. ..................... | 709/249 |
| 2004/0267920 A1 | 12/2004 | Hydrie et al. | |
| 2005/0005006 A1 | 1/2005 | Chauffour et al. | |
| 2005/0171927 A1 * | 8/2005 | Chan et al. ....................... | 707/1 |
| 2005/0181803 A1 * | 8/2005 | Weaver et al. .............. | 455/456.1 |
| 2005/0246441 A1 * | 11/2005 | Chandrasekaran et al. .. | 709/226 |
| 2006/0129684 A1 * | 6/2006 | Datta ............................ | 709/229 |
| 2006/0130064 A1 | 6/2006 | Srivastava | |

(Continued)

OTHER PUBLICATIONS

"SESM Load Balancing", Retrieved at<<http://www.cisco.com/univercd/cc/td/doc/solution/sesm/sesm_315/instconf/eldbal.htm>>, Jul. 14, 2008, pp. 1-3.

(Continued)

*Primary Examiner* — Alina N. Boutah

(57) ABSTRACT

Described is a technology in a network load balancing system (node cluster), by which client affinity is preserved across cluster configuration changes, including for new connections from a previous client. Each node maintains a list of the clients that are to remain (have affinity, or "stickiness") with that node, including following bucket redistribution resulting from convergence. Each affinity list is communicated during convergence so that other nodes may build an exception list or lists. Via a node's exception list, the node that owns a bucket corresponding to a client knows of the affinity with another node and thus drops any packets from that client. Affinity may expire, whereby the node having affinity with that client releases it and notifies the node owning the bucket for that client that the client is no longer to be treated as an exception.

20 Claims, 8 Drawing Sheets

U.S. PATENT DOCUMENTS

2006/0277180 A1* 12/2006 Okamoto ........................ 707/7
2007/0043842 A1    2/2007 Chouanard et al.
2007/0079308 A1*  4/2007 Chiaramonte et al. ............ 718/1
2008/0008095 A1*  1/2008 Gilfix ............................. 370/235
2009/0034537 A1*  2/2009 Colrain et al. ................. 370/400
2009/0287846 A1* 11/2009 Iyengar et al. ................. 709/242

OTHER PUBLICATIONS

"Network Load Balancing Parameters" <<http://technet2.microsoft.com/windowsserver/en/library/57c24429-0268-4ed8-afdf-fd4b0b6539b71033.mspx?mfr=true>>, Jul. 14, 2008, pp. 1-20.

"Network Load Balancing Technical Overview", Retrieved at <<http://technet.microsoft.com/en-us/library/bb742455.aspx>>, Updated: Jan. 21, 2005, pp. 1-10.

Aversa, et al., "Load Balancing a Cluster of Web Servers", Boston University, pp. 13.

"How Network Load Balancing Works", 2007, Microsoft, pp. 1-2.

Dragos, et al., "Design and Implementation of an MPLS Based Load Balancing Architecture for Web Switching" Dublin City University, pp. 9.

International Search Report and Written Opinion Received for PCT Application No. PCT/US2008/076271, mailed on Apr. 20, 2009, 11 pages.

PCT Patentability Report, Mar. 25, 2010, PCT/US2008/076271.

* cited by examiner

MAINTAINING CLIENT AFFINITY IN NETWORK LOAD BALANCING SYSTEMS

BACKGROUND

As packets arrive at network nodes, a technology referred to as network load balancing (NLB) distributes the load between the nodes. In one solution, each packet is received at each node, but only one of the nodes handles the packet based on attributes of the TCP connection (protocol, source IP address, source port, destination IP address, destination port) corresponding to that packet. In other words, each packet deterministically maps to a bucket based on its attributes, and each node is configured (via a process called convergence) to handle only a subset of the available set of buckets.

Thus, each incoming packet from the network clients is received by each node, and each node independently figures out (hashes) whether that packet maps to a bucket that the node owns as a result of the most recent convergence. If so, that node accepts and processes the packet, otherwise it drops the packet, knowing that the packet will instead be accepted by a different node, specifically the node that was last assigned the bucket. In this manner, once the convergence process is complete and buckets are distributed, a node can independently decide whether to accept each incoming packet without needing to query other nodes.

If the cluster configuration changes (for instance, nodes are added or removed) then the convergence process runs again and buckets are redistributed among nodes. In the event that a bucket associated with a connection has moved following the convergence, current technology ensures that any previously established TCP connection continues to be processed by the same node, even if it no longer owns the bucket.

However, a new TCP connection from an existing client is accepted by whichever node currently owns the associated bucket. This is a problem for some applications and services, which require that the same node handle all connections from the same client, regardless of cluster configuration changes.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a network load balancing system (node cluster) maintains affinity with a client so as to handle packets from the same client connection, including new connections, regardless of any cluster configuration changes. For example, each node maintains a list of the clients that are to remain (have affinity, or "stickiness") with that node, including following bucket redistribution resulting from convergence. That affinity list is propagated to one or more other nodes, such as for building an exception list by which the node owning the bucket that otherwise is responsible for that client's packets knows that the client is an exception.

In one aspect, upon receiving a packet, a node determines whether to drop or accept the packet based on data (e.g., an IP address) provided in the packet. This may include determining whether the packet maps to a bucket owned by the node, and if so, accepting the packet unless the data indicates an exception. If the packet does not map to the bucket set, it is still accepted if the data indicates that the node has affinity with the client. Affinity may expire (e.g., if client does not have any connections to the node for a configured period of time) whereby the node having affinity with that client releases it and notifies the node owning the bucket for that client that the client is no longer to be treated as an exception.

In one aspect, a convergence process is performed among a plurality of nodes in a network load balanced cluster of nodes when a node configuration changes. Convergence includes distributing buckets (that is, bucket ownership) among nodes, and communicating information that allows nodes to maintain affinity with clients. In one implementation, the information comprises affinity lists, by which bucket owners build exception lists for their bucket or buckets.

Upon exiting convergence, the nodes enter a packet handling state, including receiving packets at each node of the cluster, and at each node, accepting the packet when that node has affinity, or when the packet maps to a bucket owned by that node and no other node has affinity.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a network load balancing system (node cluster) in which the same node handles connections from the same client, including new connections, regardless of any cluster configuration changes as a result of convergence. Each node maintains a list of the clients that are to remain (have affinity, or "stickiness") with that node as connections from clients are established. During convergence, as buckets are redistributed, nodes send their affinity (stickiness) lists to new bucket owners, where they become exception lists comprising lists of clients from which the bucket owner is not to accept packets. For existing clients, nodes first use the affinity and exception lists instead of bucket assignments to ensure that client-node affinity is preserved. As a result, once a node has started handling TCP connections from a client, that same node continues to handle connections from that client, at least for a configured period of time, even if it loses ownership over the bucket associated with connections from this client.

While many of the examples described herein are directed towards affinity lists and exception lists, it is understood that these are only examples of one mechanism for maintaining client-node affinity. For example, one alternative for maintaining client-node affinity as described herein is based on using relatively small buckets, and only moving empty buckets during convergence.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and networking in general.

Figure 1:
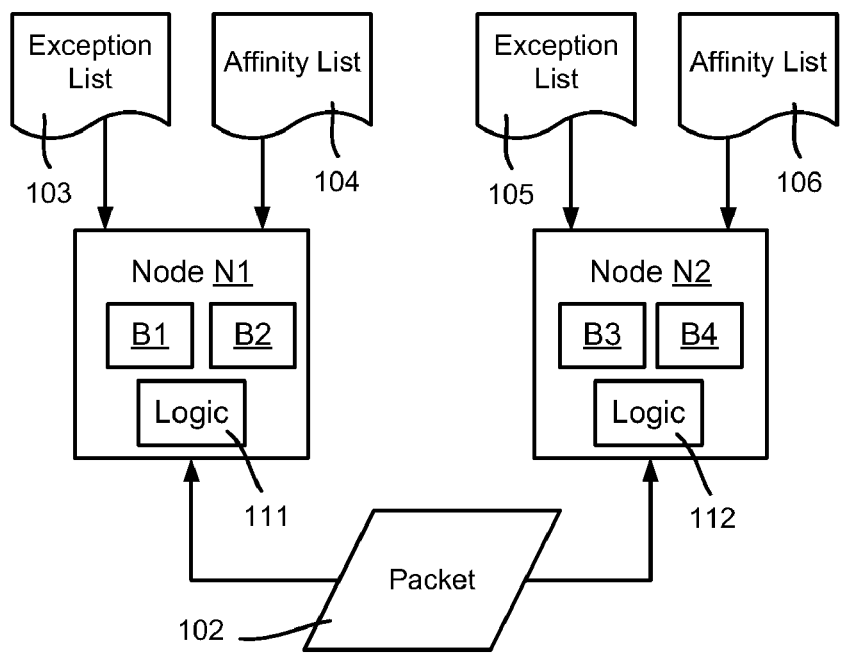
FIG. 1 is a block diagram representing example components related to packet handling in a network load balancing environment.

Turning to FIG. 1, there is shown a general block diagram of a network load balancing environment including a node cluster comprising nodes N1 and N2. As a new packet 102 is received, each node determines whether or not to handle that packet, generally based on which bucket that packet maps (hashes) into and whether or not the node owns the corresponding bucket. Thus, in the example of FIG. 1 and in general, the node N1 will handle packets that map into bucket B1 or bucket B2 and drop others, while the node N2 will handle packets that map into bucket B3 or bucket B4 and drop others. In this way, network load is balanced without requiring communication between nodes. Note that while only four buckets are shown in this example, in a typical network load balancing cluster there are sixty buckets, primarily due to the relatively large number of ways to divide the number sixty evenly among nodes. Notwithstanding, any practical number of buckets may be used.

Because of convergence (described below) in which one or more nodes are added and/or removed, buckets may be redistributed across the nodes. For example, in FIG. 2, a new node N0 has been added to the cluster, (such as by adding a new server to increase capacity, or after performing maintenance or the like on a previously operating server), upon which the convergence process has moved the bucket B1 from node N1 to the new node N0. In general, the bucket distribution mechanism guarantees that only one node owns each bucket at any given time once convergence completes. Moreover, any packets from existing client connections need to continue to be handled by the node that previously handled that connection, and thus the nodes N0 and N1 know that regardless of bucket assignment, client connections remain with their previous node.

However, new client connections from a former client that are established after convergence previously did not remain with the node, causing problems with certain applications and services, which require that the same node handle all connections from the same client. Described herein is one mechanism that uses existing bucket distribution as a basis to implement client affinity in a manner that solves this problem.

Figure 2:
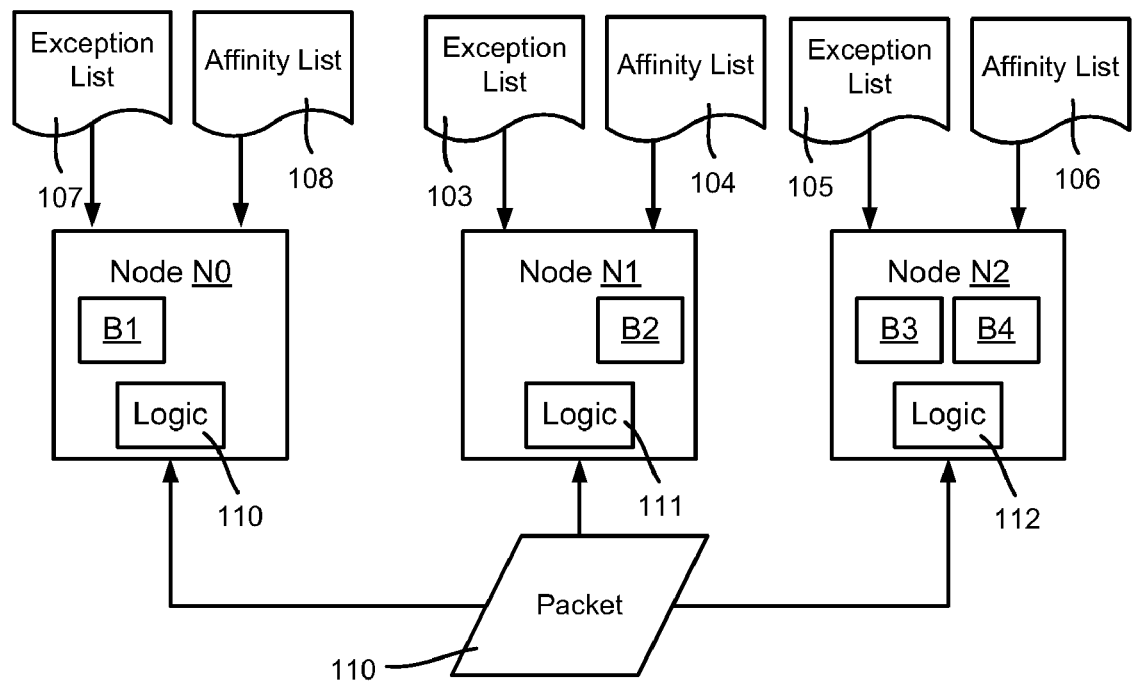
FIG. 2 is a block diagram representing example components related to packet handling, including maintaining client affinity after a node has been added.

In one implementation, client affinity is maintained in that each node maintains and refers to an affinity list as represented in FIGS. 1 and 2 via the affinity lists 104, 106 and 108. Each node includes corresponding logic 110-112 for handling packets, including for dealing with affinity and exceptions, and for performing convergence, as described below.

In one implementation, each element of the list comprises an IP address. As part of the convergence process, after nodes figure out the redistributed bucket ownership, the nodes send to each other the parts of the affinity list that they no longer own. Each new owner of a bucket collects the affinity lists from the other nodes for the buckets it owns, and builds up an exception list for these buckets, as represented in FIGS. 1 and 2 via the exception lists 103, 105 and 107. Each exception list (e.g., 103) comprises the list of IP addresses from which its corresponding node (e.g., N1) will not accept connections, knowing that another node will do so instead.

Once the nodes have completed exchanging the affinity list information and convergence completes, the cluster starts accepting packets (load) using the new distribution. At each node, any packet corresponding to a connection that is not in a bucket set (does not map to a bucket) of that node, is dropped unless it is in the affinity list; any packet that maps to a bucket is accepted unless it is in the exception list.

If a configurable period of time elapses (e.g., fifteen minutes) after which the last connection from this client ends and no new connections from this client are established, then the client will be removed from the affinity list. In other words, affinity ends if there are no connections from this client for the given interval of time. A message reporting the affinity change will be sent to the current bucket owner so that the current bucket owner can remove the client from its exception list. From this point on, if the client initiates a new connection, it will be accepted by the bucket owner, and the bucket owner will establish affinity with the client.

Figure 3:
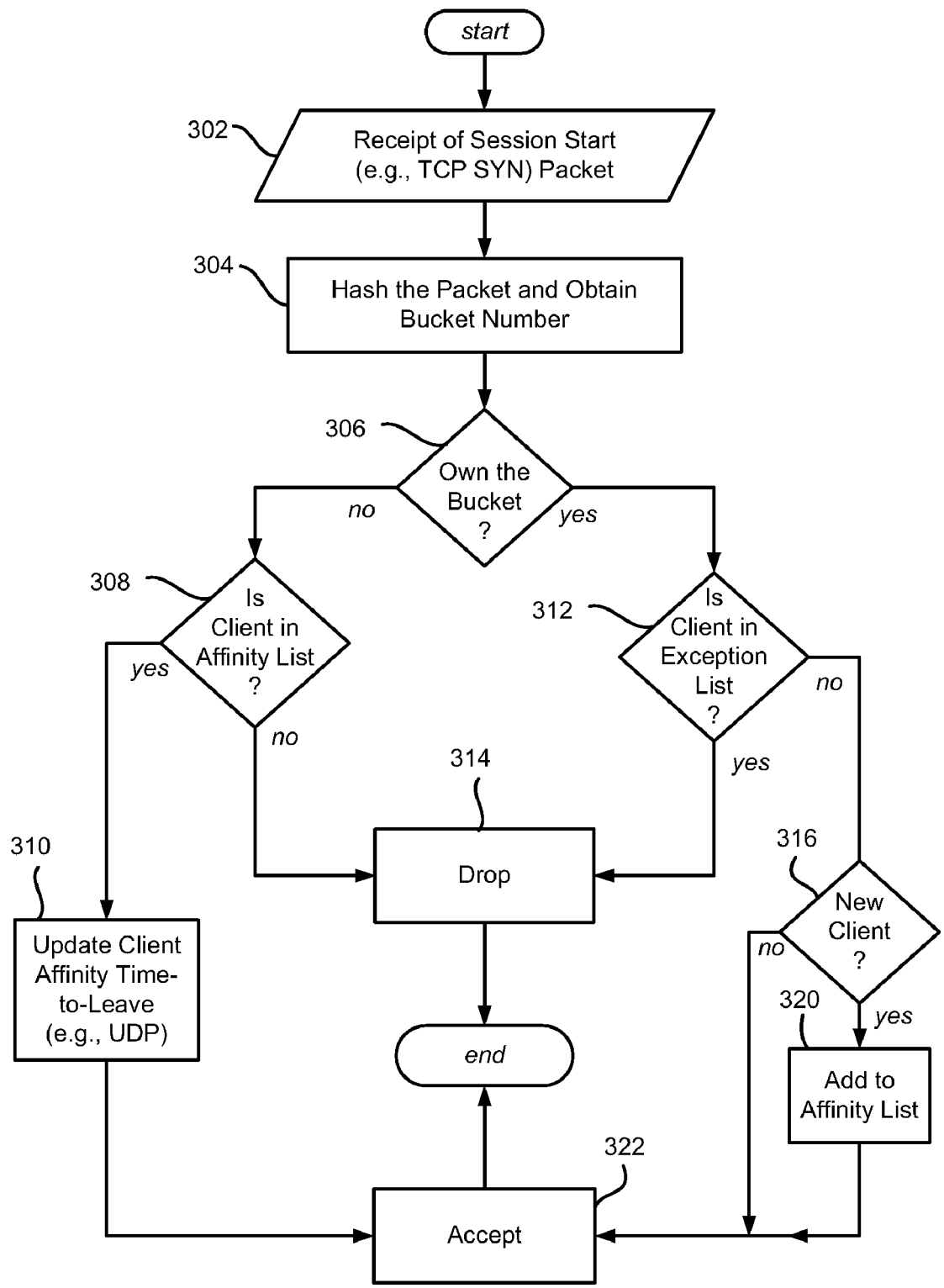
FIG. 3 is a flow diagram representing example steps taken to process a session start packet to determine whether to handle that packet.

FIG. 3 shows example steps related towards how each node in the cluster uses its own affinity list and the exception list it constructed during convergence, described below) to handle a session start packet; (for TCP this is a SYN packet). On receipt of a TCP packet at step 302, the node hashes the packet to obtain its bucket number (step 304). Step 306 evaluates whether the node owns the bucket to which this packet maps.

If this node does not own the bucket, then step 308 the checks the node's affinity list. If the node does not have affinity, the node drops the packet at step 314. For UDP (or any session-less protocol), each packet may be treated as SYN and FIN at the same time, whereby if the node has affinity, the node updates its timer (time-to-leave) for this client at step 310; (note that this is not needed for TCP). Step 322 represents the node accepting the packet.

Returning to step 306, if this node owns the bucket, at step 312 the node looks up in its exception list to determine whether another node has affinity to this client. If so, the packet is dropped as represented by step 314. If the client is not in the exception list, then at step 322 the node accepts the packet. Note that if the node has not seen this client before, then via steps 316 and 320 the node adds it to its affinity list (although for TCP this may be deferred until a later notification, in case the connection establishment fails; this is not deferred for UDP or other session-less protocol). Deferral may be extended for any other protocols that have a notion of session, such as IPSEC which provides IP datagrams, with certain attributes in the IPSEC header used to detect session stat, and is treated similarly to the TCP SYN. Session up/end notifications arrive from an IPSEC service.

Figure 4:
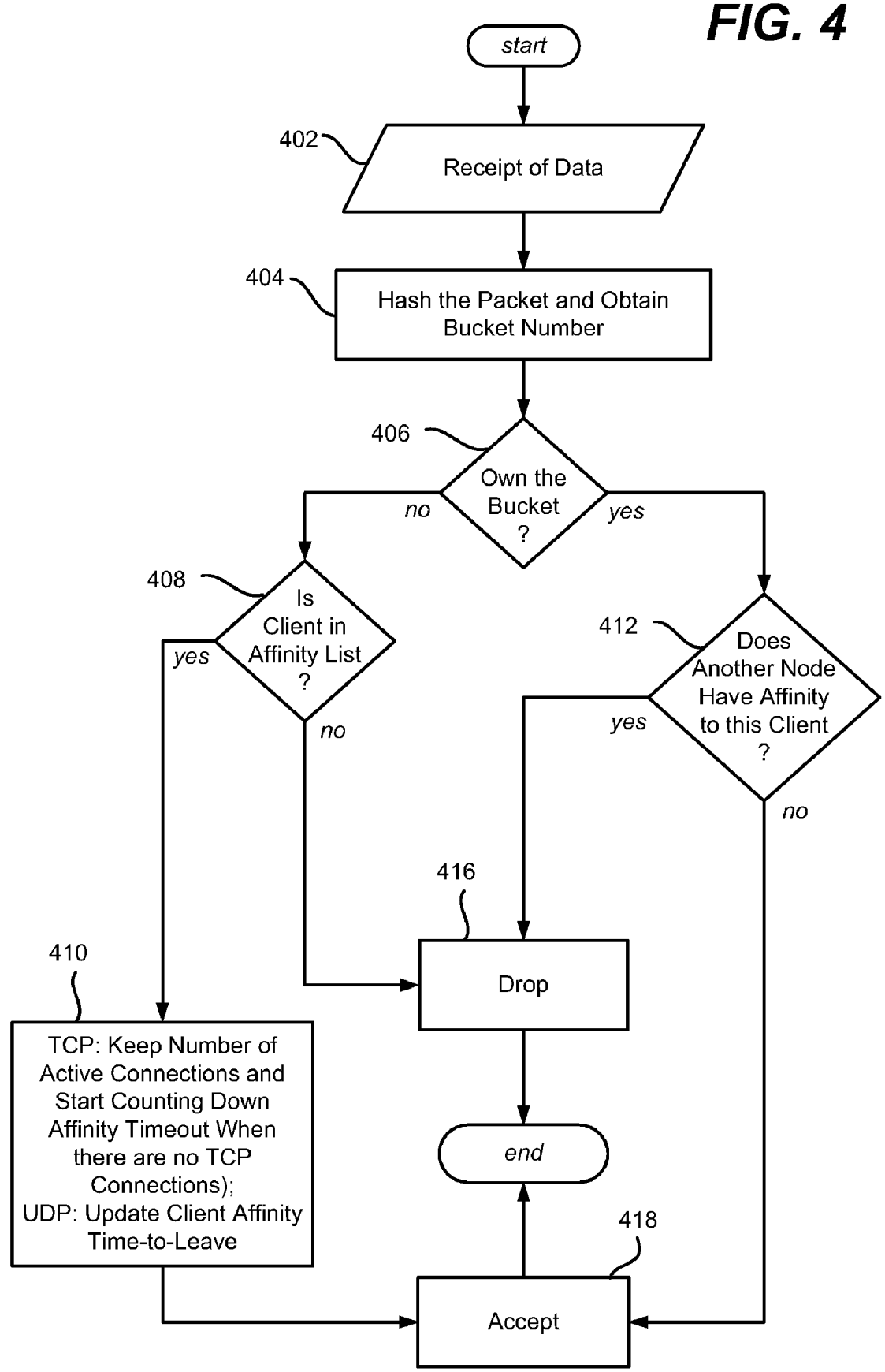
FIG. 4 is a flow diagram representing example steps taken to process a data packet to determine whether to handle that packet.

FIG. 4 shows example steps related towards how each node in the cluster uses its own affinity list and exception list constructed during convergence to handle data packets. For example, upon receipt of a TCP data packet at step 402, the node hashes the packet to obtain its bucket number (step 404). Step 406 evaluates whether the node owns the bucket to which this packet maps.

If this node does not own the bucket, then step 408 the checks the node's affinity list. If the node does not have affinity with this client connection, the node drops the packet at step 416. If the node has affinity, the node accepts the packet at step 418.

Figure 5:
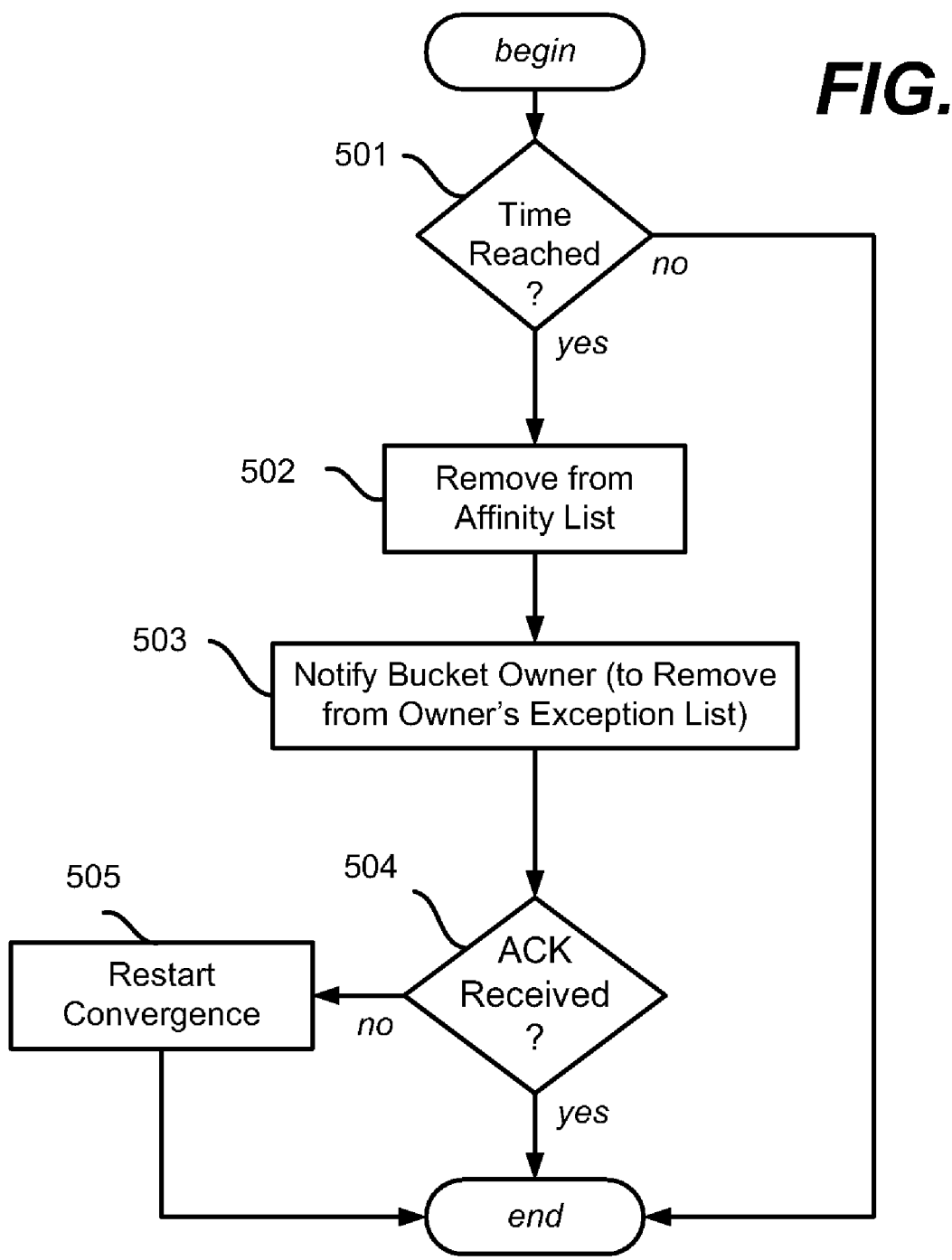
FIG. 5 is a flow diagram representing example steps taken when a client connection is removed from one node's affinity list and from another node's exception list.

Note that as generally represented at step 410, for TCP, the node keeps the number of active connections for each client; when that number reaches zero, the node starts timing how long the client has no connections; if the client does not establish a new connection within a (configurable) threshold time, the node will notify the other node that owns the bucket to take over the connection (that is, remove it from the other node's exception list), and will remove the connection from its own affinity list, as generally represented by steps 501-503 of FIG. 5. If UDP, the node updates its timer (time-to-leave) for this client at step 410. Further note that FIG. 5 may be an event driven operation, e.g., step 501 may not be an evaluated logic decision but rather may trigger steps 502 and 503.

By way of example, if the node does not observe new UDP packets from this client for the configured period of time and it does not have any TCP connections, the node removes the client from the affinity list. Alternatively, each UDP (or any other stateless protocol packet) may be treated as session start and end at the same time, resetting client's affinity timeout.

Returning to step 406, if this node owns the bucket, at step 412 the node looks up in its exception list to determine whether another node has affinity to this client. If another node has affinity, the packet is dropped as represented by step 416. Otherwise at step 418 the node accepts the packet.

In one alternative for tracking client affinity, rather than maintaining the list of IP addresses, compressed information may be maintained. One way to compress the data is to use only a network part of the IP address; this may be optionally turned on when an administrators configures a cluster with network affinity turned on.

In another alternative, affinity may be maintained by only allowing empty buckets to change ownership during convergence. This is not particularly practical for buckets on the order of sixty, but is feasible for larger numbers of buckets, such as sub-buckets. For example, each bucket may be subdivided into sub-buckets (e.g., each bucket corresponds to 1,000 sub-buckets), with clients mapped to sub-buckets, using sub-buckets instead of the affinity lists. Other nodes build exception lists based on the sub-bucket states. Only one node may own a sub-bucket at any time. Sub-buckets are not moved from a node until there are no active connections that map to this sub-bucket (the sub-bucket is empty) for the configured period of time.

Turning to various aspects related to convergence, to maintain client affinity, each node keeps an affinity list of the IP addresses to which it has affinity. When bucket move, the new owner of the bucket needs to know that another node has affinity to a client on that bucket. The convergence process is extended to circulate client affinity lists among nodes. In one implementation, once the nodes know the new owner of a bucket, those nodes communicate their corresponding affinity lists to the new owner of the bucket, which collects this information to build its exception list.

Figure 6:
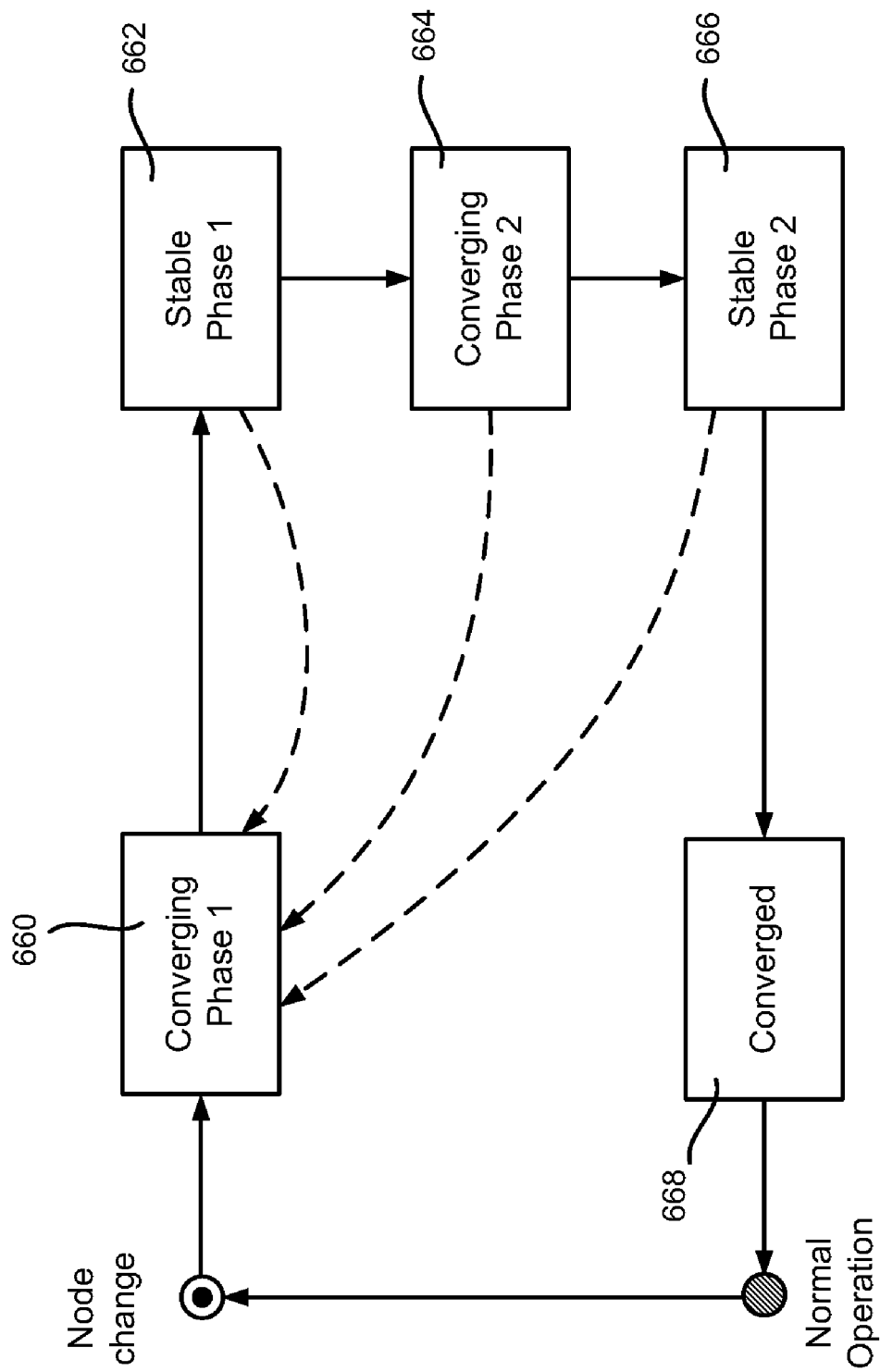
FIG. 6 is a representation of convergence including a phase for communicating client affinity information.
Figure 7:
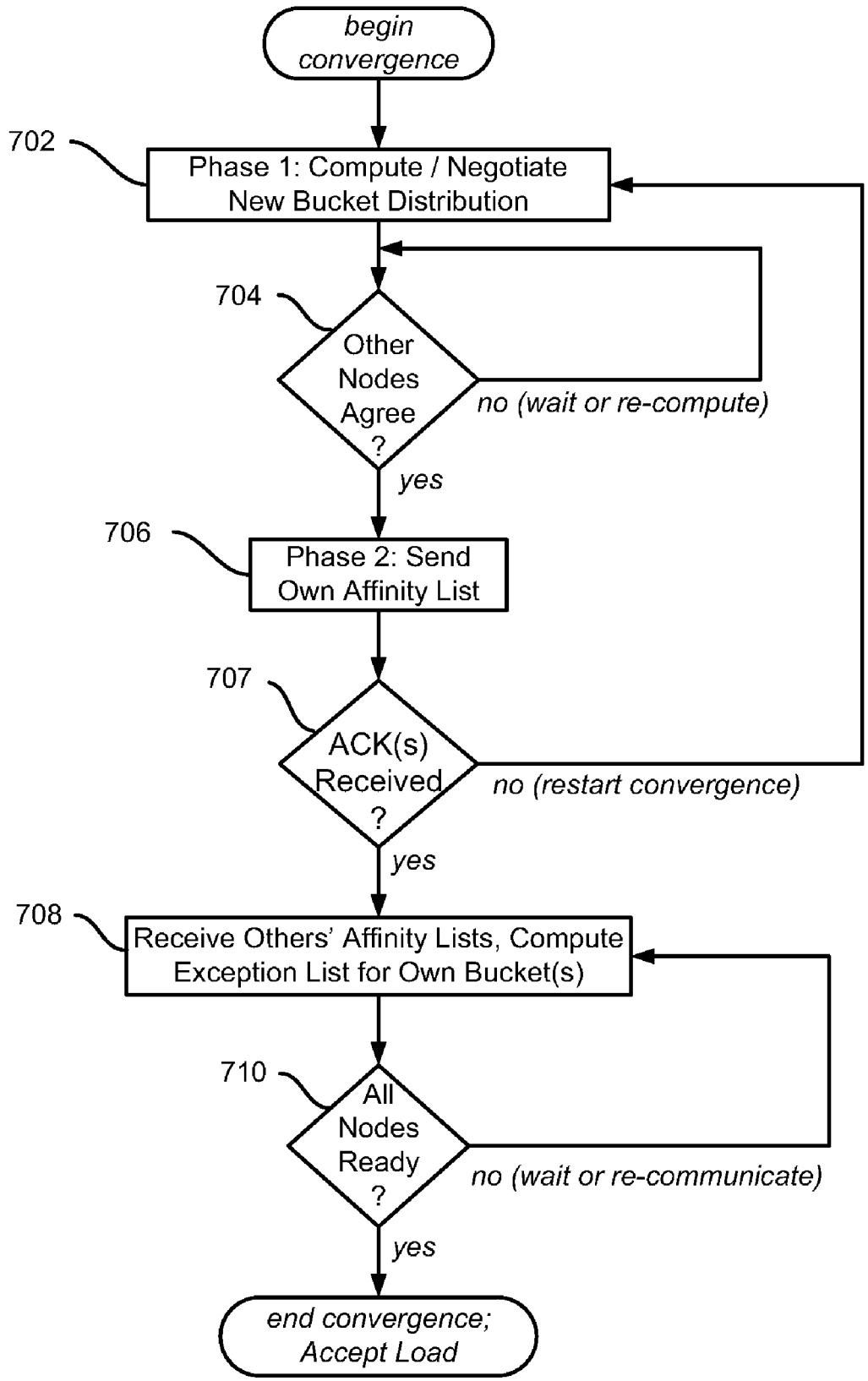
FIG. 7 is a flow diagram representing example steps taken during a convergence process.
Figure 8:
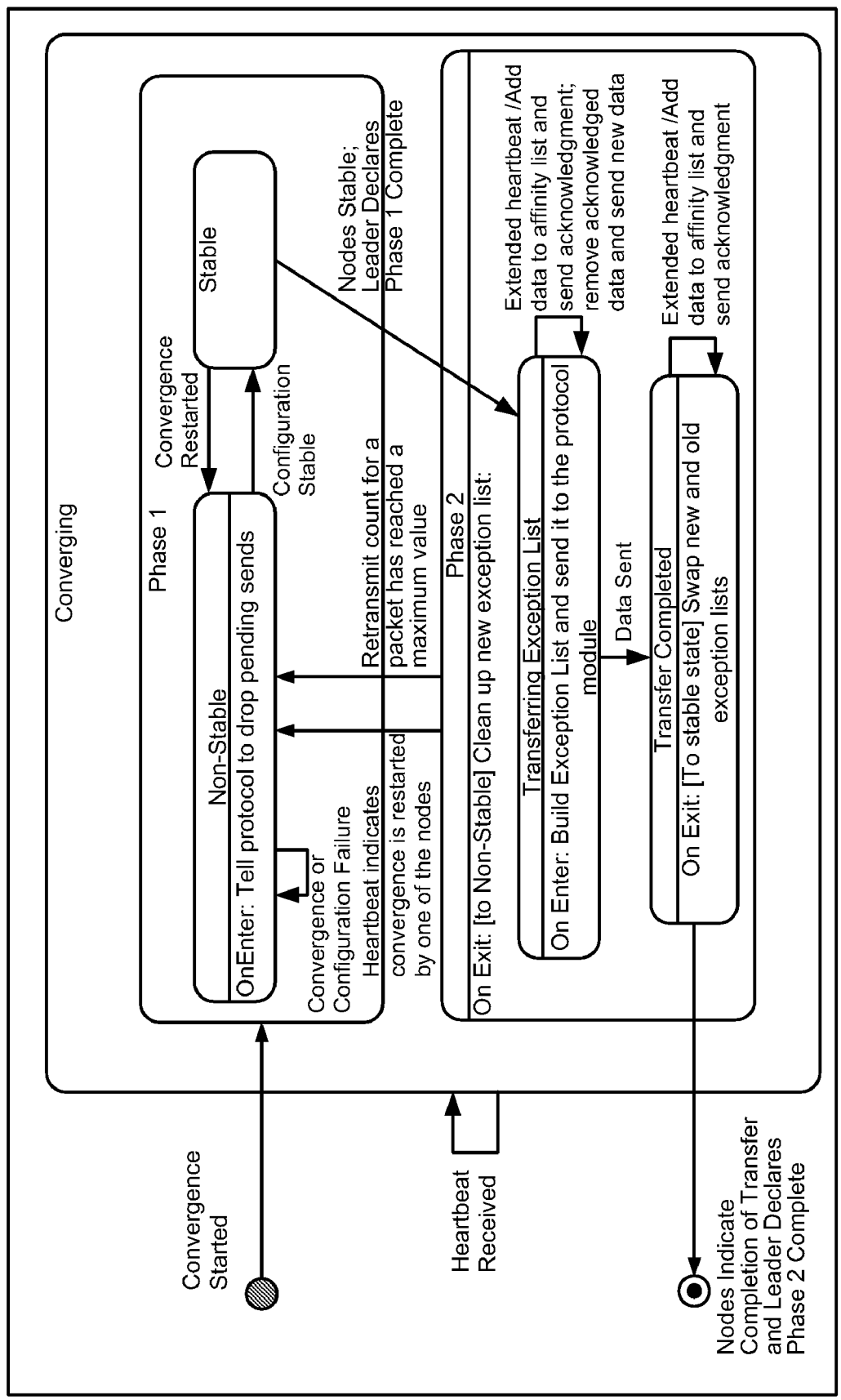
FIG. 8 is a state diagram showing states during a convergence process.

In general, FIGS. 6-8 exemplify how convergence may be extended to maintain client affinity, in which FIG. 6 shows a general flow between states, FIG. 7 shows example steps, and FIG. 8 provides a state diagram with additional details. In general, convergence occurs in response to a node change, with at least one node added to or removed from the system, as detected by heartbeats or the like. The prior convergence mechanism takes place in a first phase, Phase 1, while convergence directed towards maintaining client affinity take place in a second phase, Phase 2. A leader node, such as selected by a lowest node identifier among those of the system, controls phase changing.

During Phase 1 (block 660 of FIG. 6) bucket ownership is negotiated, as also represented at step 702 of FIG. 7. Once Phase 1 completes successfully, that is, all nodes are in a stable state (block 662) in that they agree on the bucket ownership, (step 704) the leader moves to the Phase 2 state (block 664 and step 706) and all other nodes will follow the leader.

During phase 2, nodes use a reliable network protocol to send out their affinity lists to other nodes, such as represented by step 706 of FIG. 7. Note that for efficiency, nodes may send only portions of their affinity lists that map to the buckets that they no longer own to the new owners of these buckets. If transferring this information fails, then cluster falls back to the Phase 1 convergence, (as represented by the dashed lines in FIG. 6).

Once all the information is successfully sent and acknowledged, the convergence has reached a stable state 666. At this time, the nodes build up (or have built up at step 708) their respective exception lists, each of which tells that node the connections (from what IP addresses) they should not be accepting even though they own the bucket or buckets to which these IP addresses map. At this time, the leader moves from the Phase 2 stable state to the normal operating state, and other nodes follow and start accepting load.

In general, the communication between nodes is done using heartbeats that are sent non-reliably. Each node sends a heartbeat with its current state, including the state of the buckets it owns. Losing a heartbeat does not affect the cluster because next heartbeat delivers the same information.

However, the affinity lists (and release affinity messages on a timing-out) need to be communicated to the new bucket owner in a reliable way. To this end, a reliable message delivery protocol is used during convergence, as well as on connection time-outs, to ensure that each message is delivered to the destination. There is no response needed, other than an acknowledgement to confirm that the message was delivered. One suitable protocol does not need to be routable because nodes are on the same LAN, which also provides a low-error and low-latency environment.

As mentioned above, only the current owner of a bucket needs to build an exception list for that bucket. Similarly, other nodes only need to keep their own affinity list. For efficiency, data may be grouped in the messages such that they contain information for only one bucket, with only the current bucket owner being a destination for these messages. This applies to when nodes send affinity lists for the buckets they do not own to the current bucket owner during convergence, and when in normal load handling operation a node releases a connection for a client to the current bucket owner.

One format uses a <port rule, bucket number> pair as a way to identify a recipient for a message. At any given moment only one node owns a bucket and thus this address is not ambiguous. An extended heartbeat may be used as a frame level protocol, whereby all packets are broadcast, allowing the multiplexing of data for different destinations into one packet. Each node scans the packet and reads only the sections which are destined for that node's buckets.

The <port rule, bucket number> pair is not sufficient for acknowledging message delivery, because multiple nodes might send their affinity lists for the pair. Additional source information such as <Node Id, Message Id> suffices. A generation identifier may be added to the message identifier, e.g., maintained separately at each node and increased when convergence restarts to ensure that messages from any previous generations (convergence) are dropped, increasing tolerance to any network delays.

By way of an example communication sequence, N1 sends an extended heartbeat packet that contains affinity list for the buckets 1 (owned by Node 2) and 2 (owned by Node 3), e.g.: <Port rule 1; Bucket 0><N1, 1>[data]<Port rule 1; Bucket 2><N1, 2>[data]

Node 2 and Node 3 receive the packet and extract the part that is relevant for the buckets they own:

Node 2 sends confirmation for the part it has received <N1, 1>

Node 3 sends confirmation for the part it has received <N1, 2>

Again note that confirmations do not need to include <Port rule, bucket Id> because a pair <Node Id, Message Id> sufficiently identifies the recipient. Further, if the underlying protocol is broadcast, then confirmations can be multiplexed in a single packet and each node will extract only the portion that is relevant, and moreover, messages and confirmations may be multiplexed in a single packet, by a section type (message/confirmation) and having each destination node extract the data destined for that node from the packet.

Exemplary Operating Environment

Figure 9:
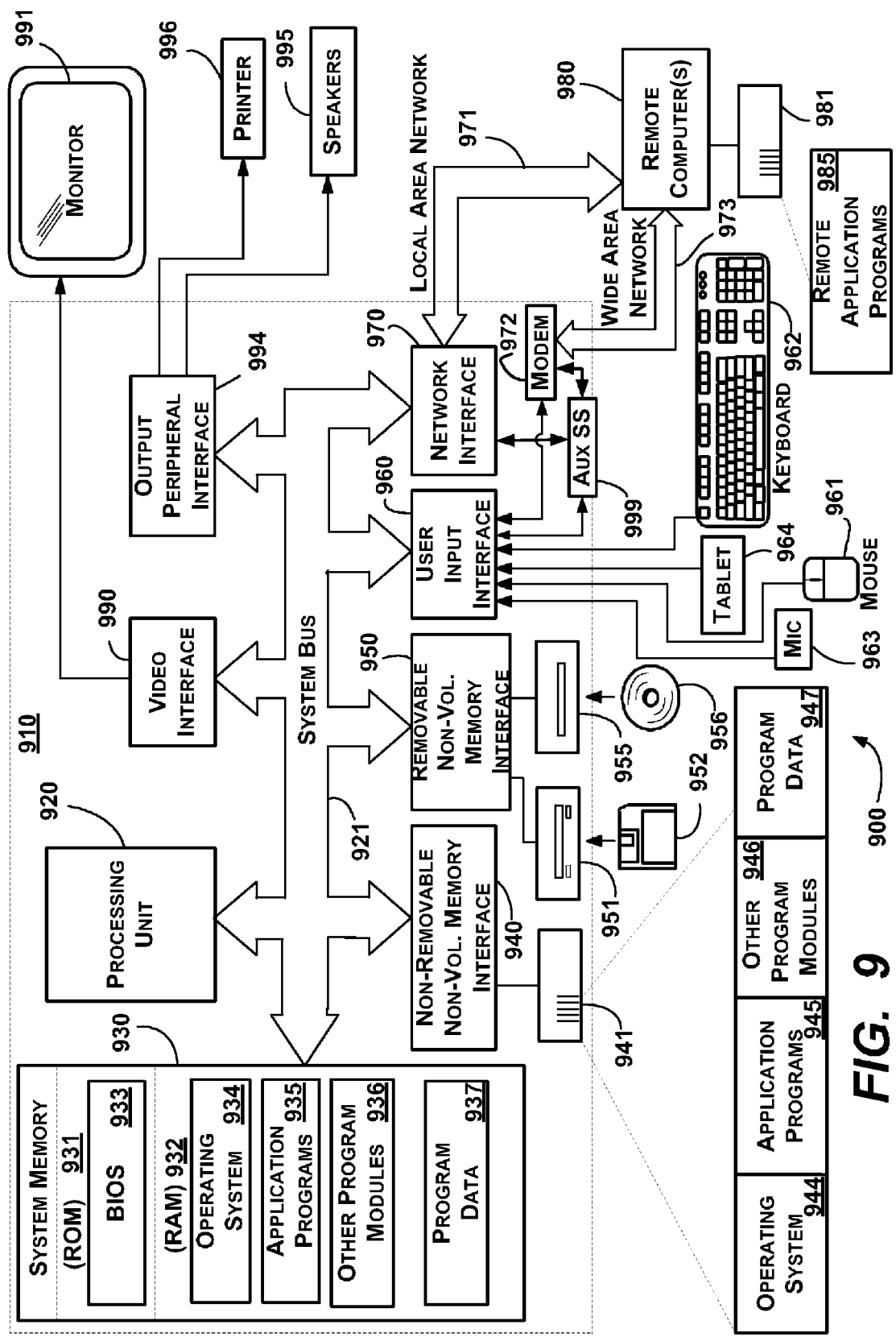
FIG. 9 shows an illustrative example of a computing environment into which various aspects of the present invention may be incorporated.

FIG. 9 illustrates an example of a suitable computing system environment 900 on which the examples of FIGS. 1-8 may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment 900.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 9, an exemplary system for implementing various aspects of the invention may include a general purpose computing device in the form of a computer 910. Components of the computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 910 typically includes a variety of computer-readable media. Computer-readable media can be any available media that can be accessed by the computer 910 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 910. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936 and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media, described above and illustrated in FIG. 9, provide storage of computer-readable instructions, data structures, program modules and other data for the computer 910. In FIG. 9, for example, hard disk drive 941 is illustrated as storing operating system 944, application programs 945, other program modules 946 and program data 947. Note that these components can either be the same as or different from operating system 934, application programs 935, other program modules 936, and program data 937. Operating system 944, application programs 945, other program modules 946, and program data 947 are given different numbers herein to illustrate that, at a minimum, they are different copies. A user may enter commands and information into the computer 910 through input devices such as a tablet, or electronic digitizer, 964, a microphone 963, a keyboard 962 and pointing device 961, commonly referred to as mouse, trackball or touch pad. Other input devices not shown in FIG. 9 may include a joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. The monitor 991 may also be integrated with a touch-screen panel or the like. Note that the monitor and/or touch screen panel can be physically coupled to a housing in which the computing device 910 is incorporated, such as in a tablet-type personal computer. In addition, computers such as the computing device 910 may also include other peripheral output devices such as speakers 995 and printer 996, which may be connected through an output peripheral interface 994 or the like.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include one or more local area networks (LAN) 971 and one or more wide area networks (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960 or other appropriate mechanism. A wireless networking component 974 such as comprising an interface and antenna may be coupled through a suitable device such as an access point or peer computer to a WAN or LAN. In a networked environment, program modules depicted relative to the computer 910, or portions thereof, may be stored in the remote memory storage device. By way of example, and not limitation, FIG. 9 illustrates remote application programs 985 as residing on memory device 981. It may be appreciated that the network connections shown are exemplary and other means of establishing a communications link between the computers may be used.

An auxiliary subsystem 999 (e.g., for auxiliary display of content) may be connected via the user interface 960 to allow data such as program content, system status and event notifications to be provided to the user, even if the main portions of the computer system are in a low power state. The auxiliary subsystem 999 may be connected to the modem 972 and/or network interface 970 to allow communication between these systems while the main processing unit 920 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable storage medium comprising memory, optical recording media, magnetic recording media, or a combination thereof, the computer-readable storage medium storing computer-executable instructions, which when executed by a node perform steps, the node participating in a plurality of nodes that each receive same incoming packets and that each maintain a corresponding client affinity list and a corresponding set of currently assigned buckets, a client affinity list of a node identifying clients associated with that node, wherein any given client is allowed to be in only one affinity list at any given time, and wherein periodic load-rebalancings cause some buckets to be reassigned between nodes, the steps comprising:
    servicing the set of buckets currently assigned to the node, wherein buckets are periodically added to and removed from the set of buckets currently assigned to the node when there are corresponding load-rebalancings of the plurality of nodes;
    receiving packets at the node from a source, the packets having also been received by another node; and
    for any given packet of the received packets, deciding whether to service the given packet, the given packet including client data that identifies a client that sent the given packet, and
        deciding to service the given packet by determining that the given packet maps to a bucket in the set of buckets currently assigned to the node;
        when the given packet does not map to a bucket in the set of buckets currently assigned to the node, deciding to service the given packet by using the client data in the given packet to determine that the client identified in the client data is present in the affinity list; and
        deciding to not service the given packet by determining that the client identified in the client data is not present in the affinity list and determining that the given bucket does not map to a bucket in the set of buckets currently assigned to the node.

2. The computer-readable storage medium of claim 1, the steps further comprising, wherein the given packet maps to a bucket in the set of buckets currently assigned to the node which is not in the affinity list, and deciding not to service the given packet by determining that the client identified in the client data is in an exception list identifying clients that have affinity with other of the nodes.

3. The computer-readable storage medium of claim 2 having further computer-executable instructions comprising, building the exception list based on affinity information provided by at least one other node, the affinity information in an affinity list stored on the at least one other node.

4. The computer-readable storage medium of claim 3 having further computer-executable instructions comprising, receiving information from the at least one other node that the at least one other node has released affinity with the client, and in response, removing the client from the exception list.

5. The computer-readable storage medium of claim 1 wherein the client is added to the affinity list based on the node having an open connection with the client when a load-rebalancing occurs.

6. The computer-readable storage medium of claim 5 having further computer-executable instructions comprising, removing the client from the affinity list of the node when the node determines that it has no connections to the client for a period of time, and notifying another node having a bucket, in its set of currently assigned buckets, that maps to the given packet, that the node is releasing affinity with the client.

7. The computer-readable storage medium of claim 6 having further computer-executable instructions comprising, during or when entering a load-rebalancing, communicating the client affinity information to the at least one other node.

8. In a computing environment, a system comprising, a plurality of nodes, each node including logic executed by memory and a processor, the logic selectively accepting only certain packets based on information contained within each packet, wherein buckets are reassigned among the nodes when there is a load-rebalancing of the plurality of nodes, the system including logic that determines whether a packet maps to a bucket currently owned by that node, and determines whether the packet corresponds to a client with which the node has affinity or whether the packet corresponds to a client with which the node knows of as an exception, and the logic configured to accept the packet when the node has affinity and the packet does not map to a bucket currently owned by that node, and the logic configured to accept the packet when the packet maps to a bucket currently owned by that node and it has been decided that there is no exception associated with the client corresponding to the packet.

9. The system of claim 8 wherein the logic is further configured to perform the load-rebalancing, including sending affinity information to at least one other node, and to be notified of received affinity information from at least one other node, the logic building an exception list based on the received affinity information so as to know which client or clients have exceptions.

10. The system of claim 8 wherein the logic is further configured to remove an exception upon notification from another node that the other node no longer has affinity with a client.

11. The system of claim 8 wherein the logic is further configured to notify another node of no longer having affinity with a client.

12. A method implemented by each node in a plurality of load-balancing nodes, each node comprising a processor and memory that perform the method, the method performed by any given node comprising:

maintaining hash information indicating hash values that are currently assigned to the given node, wherein when a convergence occurs for the plurality of load-balancing nodes the hash information indicates a new set of hash values currently assigned to the given node in response to the convergence;

maintaining an association list of clients associated with the given node;

receiving a plurality of packets from clients via network connections between the given node and the clients, respectively;

computing a hash value of each received packet;

dropping a first plurality of the received packets based on the computed hash values thereof indicating that corresponding buckets are not currently assigned to the given node, unless the nodes that sent such packets are included in the association list; and passing a second plurality of the received packets based on the computed hash values thereof indicating that corresponding buckets are currently assigned to the given node.

13. The method of claim 12 further comprising sending an association list from one node to at least one other node.

14. The method of claim 13 further comprising, receiving the sent association list at the other node and using the received affinity list to build an exception list.

15. The method of claim 12 further comprising performing a convergence by reassigning hash values among nodes by identifying hash values that to not have a connection to a client and reassigning only the identified hash values.

16. The method of claim 12 further comprising, entering a packet handling state at the given node, including receiving a packet from a client at the given node and accepting the packet when the packet maps to a hash value assigned to that node and when no other node has an association list that includes the client.

17. The method of claim 16 further comprising, at the given node, receiving a message indicating that another node has released affinity with a client, and in response, removing an exception for that client from an exception list maintained at the given node.

18. The method of claim 12 further comprising, notifying at least one other node that affinity with a client is released such that the other node begins accepting packets from the client.

19. The method of claim 18 further comprising, determining that affinity is to be released based upon a time limit associated with the client.

20. A method according to claim 12, the method performed by the given node further comprising: maintaining an exclusion list of clients not associated with the given node, and dropping a third plurality of the received packets that have hash values corresponding to buckets currently assigned to the given node, the dropping based on the clients that sent the third plurality of the received packets being included in the exclusion list.

* * * * *